(No Model.)
H. HECKEL.
APPARATUS FOR DECOMPOSING FATS AND OILS.
No. 255,504. Patented Mar. 28, 1882.
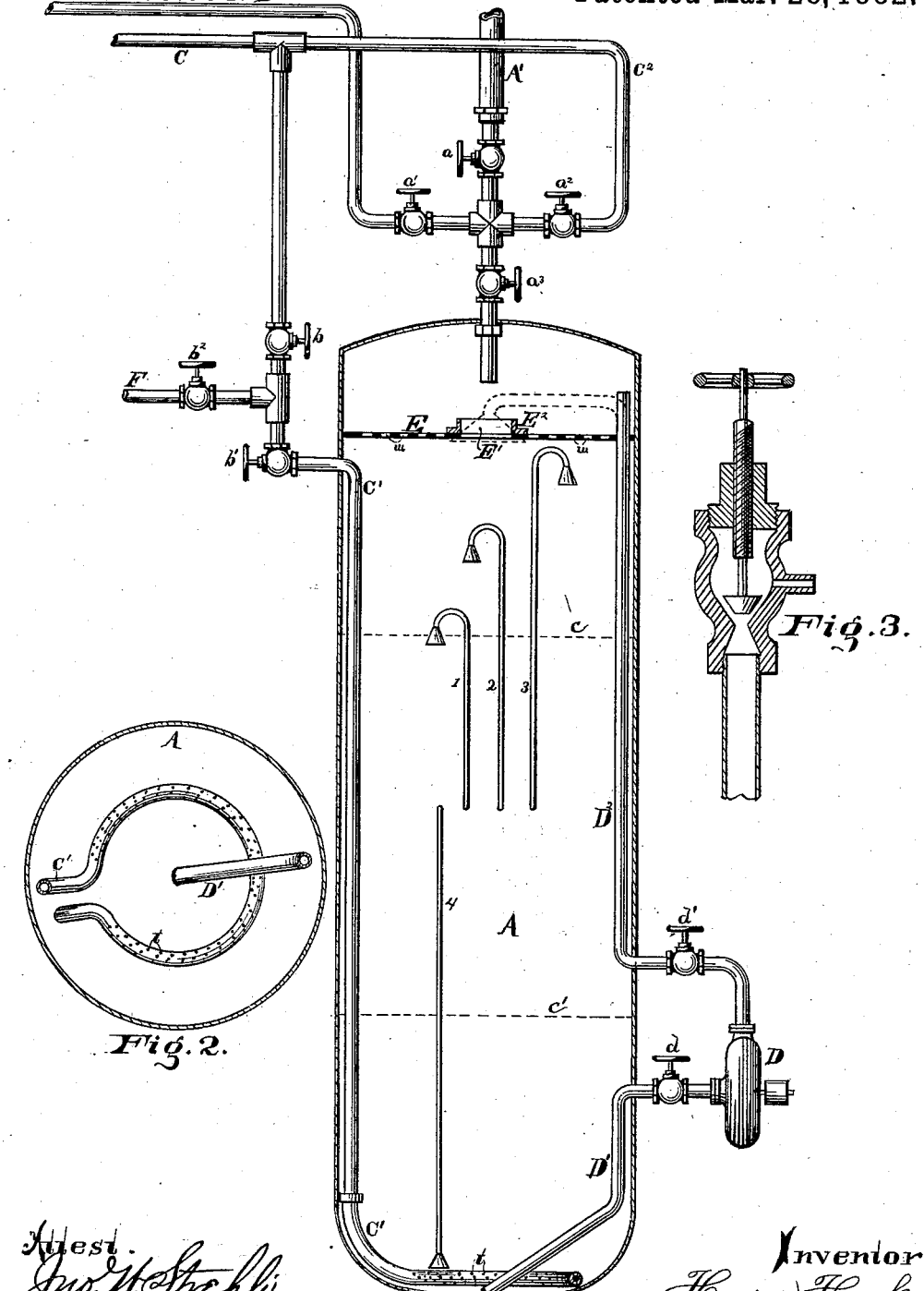

UNITED STATES PATENT OFFICE.

HENRY HECKEL, OF CINCINNATI, OHIO.

APPARATUS FOR DECOMPOSING FATS AND OILS.

SPECIFICATION forming part of Letters Patent No. 255,504, dated March 28, 1882.

Application filed May 15, 1880. Renewed February 25, 1882. (No model.)

*To all whom it may concern:*

Be it known that I, HENRY HECKEL, of the city of Cincinnati, in the county of Hamilton and State of Ohio, have invented certain new and useful Improvements in Apparatus for Decomposing Fats and Oils, of which the following is a specification.

The object of my invention is to provide apparatus for thoroughly, cheaply, and rapidly decomposing fat and oil, whereby the glycerine contained in the fat is extracted, leaving the different fat acids in a condition to be separated by pressure; and my invention consists of certain means, to be hereinafter fully described, whereby the above object is accomplished.

In the drawings forming part of this specification, Figure 1 represents a vertical central section through the tank or digester, and shows the arrangement of pipes and valves, through the medium of which the objects of my invention are accomplished. Fig. 2 is a horizontal section through the lower part of the digester, showing the arrangement of the pipes at the bottom. Fig. 3 represents one form of try-cock, to be used in the various positions hereinafter specified.

A is the tank or digester, in the upper portion of which is located the diaphragm E, provided with perforations $w$. The fat or oil to be decomposed is introduced into this digester through the inlet-pipe A' by opening the valves $a$ $a^3$ until the tank is about one-half full, when the valve $a$ is closed. The valves $b$ $b'$ are now to be opened and steam from a boiler introduced through the pipes C C' to the interior of the digester. The pipe C' passes to the bottom of the digester, and its lower end preferably lies horizontally and in the form of a coil, as shown in Fig. 2, and is provided with a number of small openings, $t$, through which steam may escape to the interior of said digester. By causing the steam to enter the digester at the bottom it must of necessity pass through the fat as it rises to the surface, thus keeping the fat at an even temperature throughout. Steam is kept passing through the said pipe C' until the pressure in the digester is nearly equal to that in the boiler, which should be at least one hundred pounds to the square inch. The valve $a'$ is now opened and hot water from a boiler introduced into the digester through the pipe B, the water passing through aperture E' in the diaphragm E and falling upon the fat beneath. Such hot water is permitted to flow into the digester until the mixture of fat and water rises to that point in the tank which is indicated by the dotted line $c$. The fact that the mixture has reached this point is determined by the escape of liquid from a try-cock located outside of the digester and connected by a suitable pipe to the lower end of the pipe 1, located within the boiler. The upper end of this pipe is preferably provided with a suitable strainer. When the liquid has risen to this point $c$ the valve $a'$ is closed, stopping the inflow of water. The digester is now properly charged, and the process of forming an emulsion from the fat and water is to be commenced. This I accomplish by means of a rotary or centrifugal pump, D, communicating with the interior of the digester by the pipes D' and D², the pipe D' opening at the bottom and the pipe D² at the top. The valves $d\, d'$ are opened and the pump set in motion. When the pump is first started nothing but pure water is pumped up, as the water which was introduced from the boiler, being heavier than the fat, has settled to the bottom of the digester and occupies the space between the bottom and the dotted line $c'$, the fat rising to the level of the dotted line $c$. The water which is drawn up through the pipe D' by the pump D is discharged into the digester at the top through the pipe D². As it leaves the inner opening of this pipe it falls upon the perforated diaphragm E, through which it falls in a finely divided form upon the fat. The shoulder E² of the diaphragm prevents the water on the latter from ordinarily running through aperture E'. Should, however, the discharge through the pipe D² be too rapid, the aperture E' will afford an overflow conduit for the water into the lower portion of the digester. As the pump D is continued to be operated and the liquid drawn from the bottom and discharged again at the top of the digester through the pipe D² a gradual mixture of the fat and water takes place, until by the continued operation of the pump a perfect emulsion is formed. While this process is going on steam is constantly being introduced to the digester through the pipes C C', keeping the liquid at an even temperature throughout, and also keeping it under a heavy pressure, which I preferably keep at about one hundred and fifty pounds. As this steam is introduced at the bottom of the digester and passes through the liquid as it rises to the top of the digester a certain portion of the steam becomes condensed, and as this occurs the level of the liquid must of necessity rise. This rise of the liquid is determined by the flow through outside try-cocks suitably connected with the pipes 2 and 3, located within the digester, and having their open ends each preferably provided with a strainer. The liquid is not permitted to rise above the level of inner opening of the pipe 3, as the space above this must be left for the steam to occupy in order to keep up the required amount of pressure, also so that the water by falling through the diaphragm may be finely divided, and also that the water may come in contact with the steam after leaving the diaphragm and after being finely divided. If the liquid rises to this point, a portion of it is withdrawn from the digester in the following manner, viz: The pump is stopped and valve $b$ closed and valve $a^2$ opened, so as to keep up the pressure of the steam within the digester. The water will then settle at the bottom of the digester. Valve $b^2$ is then opened, whereupon the pressure within the digester will force the water through pipes C' and F out into a suitable receiving-vessel. As soon as sufficient water has been withdrawn the valves $a^2$ and $b^2$ are closed and valve $b$ reopened, and the pump again started.

When the operation of pumping and mixing the liquid has been carried on for a sufficient length of time (about seven hours being required by the use of my improved apparatus when the pressure is as low as one hundred and fifty pounds per square inch, and a less amount of time than seven hours being required when the pressure is more than one hundred and fifty pounds to the square inch, which can be ascertained by subjecting some of the liquid to the proper tests) the motion of the pump is stopped, and the valves $d$ and $d'$ are closed and the liquid allowed to remain at rest for a short time; but the pressure of steam within the digester is still kept up by opening valve $a^2$ and closing valve $b$. The water will now gradually separate from the rest of the liquid, and, being heavier than the oil, will settle to the bottom.

By the above-described operation the glycerine contained in the fat has all been separated from the fat acids and taken up by the water, and remains in solution in the water as the latter settles to the bottom of the digester, leaving the different fat acids in the upper part of the digester. When the water and glycerine have become separated from the fat acids, which is determined by examination of some of the liquid drawn from the outside try-cock connected with the inner pipe, 4, extending to the bottom of the digester, and having its open end provided with a strainer, the valve $b^2$ is opened, and the liquid in the bottom, which is now water holding the glycerine in solution, is forced up through the pipe C' and into the outlet-pipe F, by which it is conveyed into a proper receptacle. This process of emptying the digester is continued until all of the water and glycerine has been forced from the digester, when the communication between the outlet-pipe F and the reservoir, into which the water and glycerine have been conveyed, is closed and communication is opened between said outlet-pipe F and another receptacle, into which the fat acids, &c., are conveyed by keeping up the pressure within the digester, and thus forcing the fat acids, &c., into said receptacle. This is continued until the digester is entirely emptied. I now have the water holding the glycerine in solution in one receptacle, and the fat acids freed from glycerine in another. The water and glycerine are now to be conveyed to an evaporating-pan and the water evaporated, which leaves the glycerine in a crude state, ready for the refinery, which prepares it for market. The different fat acids which have been freed from glycerine, the bond of union which previously held them together, can now be readily separated from each other by subjecting them to any of the well-known and proper processes.

In the foregoing description it will be observed that I have described the operation of the apparatus as I proceeded with the description of the invention itself.

Various kinds of apparatus and devices have been constructed with a view to accomplish the purpose of my invention, and with nearly all of them it is necessary to use lime or some alkali in order to make a perfect emulsion from the fat and water. With my apparatus I am enabled to keep the liquid at an even temperature throughout and under a constant and steady pressure of steam, and am also enabled to dispense with the use of any alkali, and can, as before stated, accomplish the desired object—viz., separate the glycerine from the fat acids—in much less time than is required by the use of any other apparatus now known to me, the same pressure of steam being employed.

The diaphragm E may, if desired, be omitted, in which event the pipe $D^2$ should terminate, as shown by the dotted lines, in an enlarged sieve-like extremity, which latter will separate the liquid passing through it into the form of spray.

The try-cock pipes 1, 2, 3, and 4 preferably emerge from the digester at the same level, as shown, for convenience of the operator.

I preferably use a rotary or centrifugal pump, as shown; but any other suitable kind of pump may be substituted, should the manufacturer so desire, to accomplish the same purpose. The application of a centrifugal pump for the purpose of continually turning over the liquids within the digester is, I believe, new with me, and is of great advantage in promoting the success of my invention.

The arrangement of pipes and valves in connection with inlet-pipe A' and pipe C' is also of my invention; and the convenience and utility of the same are already apparent in the operation thereof. Both this latter-mentioned feature of my invention and the feature relating to finely dividing the fluids and liquids while in the steam-space are preferably employed together; but either may be usefully employed without the other.

The process of extracting glycerine from neutral fats herein described will be claimed in another patent.

What I claim as new and of my invention, and desire to secure by Letters Patent, is—

1. In a digester for decomposing fats, the combination of a broad, flat, perforated diaphragm located and operated in the steam-space and above the fat and water line, and the pipes D' D², pump D, perforated steam-pipe C', by which the steam is directed in jets into and caused to flow up through the mass, substantially as before set forth.

2. In combination with a digester for decomposing fats, the pipes A' B C C², valves $a$ $a'$ $a^2$ $a^3$, pipes C' F, valves $b$ $b'$ $b^2$, pump D, and pipes D' D², provided with suitable valves, $d$ $d'$, substantially as and for the purposes set forth.

3. In combination with a digester for decomposing fats, the pipes A' B C C², valves $a$ $a'$ $a^2$ $a^3$, pipes C' F, valves $b$ $b'$ $b^2$, pump D, pipes D' D², provided with suitable valves, and a perforated diaphragm, the latter being located and operating in the steam-space and above the fat and water line, substantially as and for the purposes set forth.

HENRY HECKEL.

Witnesses:
 ALBERT PADDACK,
 E. R. HILL.